(12) United States Patent
Vandemierden

(10) Patent No.: US 10,118,182 B2
(45) Date of Patent: *Nov. 6, 2018

(54) INCINERATION BYPRODUCT PROCESSING AND METHODS

(71) Applicant: Pure Recovery Group, L.P., York, PA (US)

(72) Inventor: John Vandemierden, York, PA (US)

(73) Assignee: PURE RECOVERY GROUP, L.P., York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,969

(22) Filed: Feb. 15, 2017

(65) Prior Publication Data

US 2017/0157620 A1    Jun. 8, 2017

Related U.S. Application Data

(60) Continuation of application No. 14/510,349, filed on Oct. 9, 2014, now Pat. No. 9,573,139, which is a division of application No. 13/835,668, filed on Mar. 15, 2013, now Pat. No. 8,905,242, which is a continuation-in-part of application No. 13/481,177, filed on May 25, 2012, now abandoned.

(51) Int. Cl.
| | | |
|---|---|---|
| B03B 9/04 | (2006.01) | |
| B07B 15/00 | (2006.01) | |
| B03C 1/247 | (2006.01) | |
| B03C 1/30 | (2006.01) | |
| B03C 1/10 | (2006.01) | |
| B03B 7/00 | (2006.01) | |
| B30B 9/02 | (2006.01) | |
| B30B 9/12 | (2006.01) | |
| B30B 9/24 | (2006.01) | |
| C02F 11/14 | (2006.01) | |
| C02F 11/12 | (2006.01) | |

(52) U.S. Cl.
CPC ............... *B03B 9/04* (2013.01); *B03B 7/00* (2013.01); *B03C 1/10* (2013.01); *B03C 1/247* (2013.01); *B03C 1/30* (2013.01); *B07B 15/00* (2013.01); *B30B 9/02* (2013.01); *B30B 9/12* (2013.01); *B30B 9/24* (2013.01); *C02F 11/14* (2013.01); *B03C 2201/18* (2013.01); *C02F 11/12* (2013.01)

(58) Field of Classification Search
CPC .... B03B 7/00; B03B 9/00; B03B 9/04; B03C 1/10; B03C 1/30; B03C 1/247; B03C 2201/18; C02F 1/02; C02F 11/12; C02F 11/121; C02F 11/18; C02F 11/14; B30B 9/02; B30B 9/12; B30B 9/24; B07B 15/00
USPC ...................................... 209/12.1, 17, 38, 39
See application file for complete search history.

*Primary Examiner* — Joseph C Rodriguez
*Assistant Examiner* — Kalyanavenkateshware Kumar
(74) *Attorney, Agent, or Firm* — FisherBroyles LLP; Anthony Dovale

(57) ABSTRACT

Methods and systems for processing incineration byproduct from waste incinerators, ash purification and recovery of materials and metals. High levels of aggregate and metals recovery and ash purification are achieved for residual ash with reduced environmental contaminants.

20 Claims, 5 Drawing Sheets

INCINERATION BYPRODUCT PROCESSING AND METHODS

RELATED APPLICATIONS

This application is a divisional of U.S. application Ser. No. 13/835,668 filed Mar. 15, 2013, which is a continuation-in-part of U.S. application Ser. No. 13/481,177, filed May 25, 2012.

FIELD OF THE INVENTION

The present disclosure and related inventions is in the general field of materials processing, including byproduct and waste material processing, recycling, refining and reclamation.

BACKGROUND OF THE INVENTION

Municipal waste incineration is well established for waste management and disposal, and is also capable of providing an energy source. Incineration combustion byproducts, including of non-combustibles such as glass and concrete, partially burned and unburned materials, and metals—ferrous and non-ferrous, and ash is presently landfilled. Due to the high impurity of untreated or minimally process incineration ash, accepting landfills must be environmentally secure. Increasing environmental regulations and restriction on landfill material directly impact incinerator operations and capacity. With increasing amounts of waste incineration byproduct requiring disposal, standards of performance for municipal solid waste landfills place further restrictions and requirements on the exact content of such material.

Ash material from waste combustors, or incineration ash, which may also include municipal or some residual waste systems currently are landfilled. Some facilities remove ferrous metals from ash utilizing drum magnets. Fewer facilities also remove non-ferrous metals, but even those facilities that do make an attempt to remove ferrous and non-ferrous do not capture all the metals within the ash. The fine wet ash material sticks to the metals, especially small metal pieces, and binds traditional separation equipment. Additionally, the only byproducts produced from the prior processes are only the metals. The residual material is landfilled. Impurities in landfilled waste ash material, such as metals and other ferrous and non-ferrous particles, present a problem for compliance with increasingly strict environmental controls on landfill ash. Mass or material balance analysis has not heretofore been applied to management of incineration ash.

SUMMARY OF THE DISCLOSURE

Systems and methods for treatment of municipal waste incineration byproduct are disclosed which produce high quality aggregate materials and recovery of ferrous and non-ferrous metals, and ash of higher purity. The systems and methods oldie disclosure deconstructs mixed ash waste (bottom and fly ash) generated by WTE facilities and generates clean recycled products while making final waste products for disposal more environmentally friendly. The systems and methods of the disclosure enhance ferrous and non-ferrous metals recovery (higher grade material), generate clean inert aggregate products for use in asphalt, generate a sand product with multiple potential uses, generate an industrial solid fuel source, an generate an easily handled and purified dry ash cake for disposal. The system screens material by size and then utilizes a combined liquid/screening process to separate recycled product from waste ash. Small materials are then separated by density, and the remaining ash is separated from the water via a chemical/physical water treatment systems so that the water is recycled within the system and the ash is pressed into dewatered cakes for disposal.

Through mass balance testing, the system and variants have shown to be able to reduce landfill disposal amounts by 50% from prior art systems and methods, and reductions of up to 70% or higher with the described recycling of aggregate products. These disposal reductions result in huge avoided costs with significant levels of increased revenues from the sale of recycled products such as metals and asphalt additives. Testing of incoming ash material and end products produced by the system and methods of the disclosure as compared to prior art methods has verified significant and substantial reductions of heavy metals in the disposal ash. The systems and methods of the disclosure thus reduce processor and facility environmental liability and makes the ash material easier to handle at landfill facilities with respect to leachate generation and treatment. Validated mass balance substantiates the effectiveness of the disclose systems and methods by the measured increased yield of useable byproducts and the reduction in ash volume for disposal.

The systems and methods of the disclosure are more environmentally beneficial than the existing practice of direct landfilling. The systems and methods of the disclosure recovers useable energy and materials from waste that is disposed of by existing practices.

In accordance with one aspect of the ash processing and metals recovery systems and methods of the disclosure, an incineration byproduct processing system includes a first screen for separation of particles having dimensions greater than approximately three inches from the incineration byproduct; a wash plant for accepting ash and particles having dimensions less than approximately three inches from the incineration byproduct, the wash plant having a basin containing water and one or more sand screws and one or more adjustable weir plates; a first wash plant screen for separating particles having dimensions greater than approximately one inch from the incineration byproduct in the wash plant; a second wash plant screen for separating particles having dimensions greater than approximately one-half inch; a third wash plant screen for separation of fine particle fraction from the incineration byproduct, and the sand screws operative to transfer aggregate sand from the basin of the wash plant.

DETAILED DESCRIPTION OF PREFERRED AND ALTERNATE EMBODIMENTS

Figure 1:
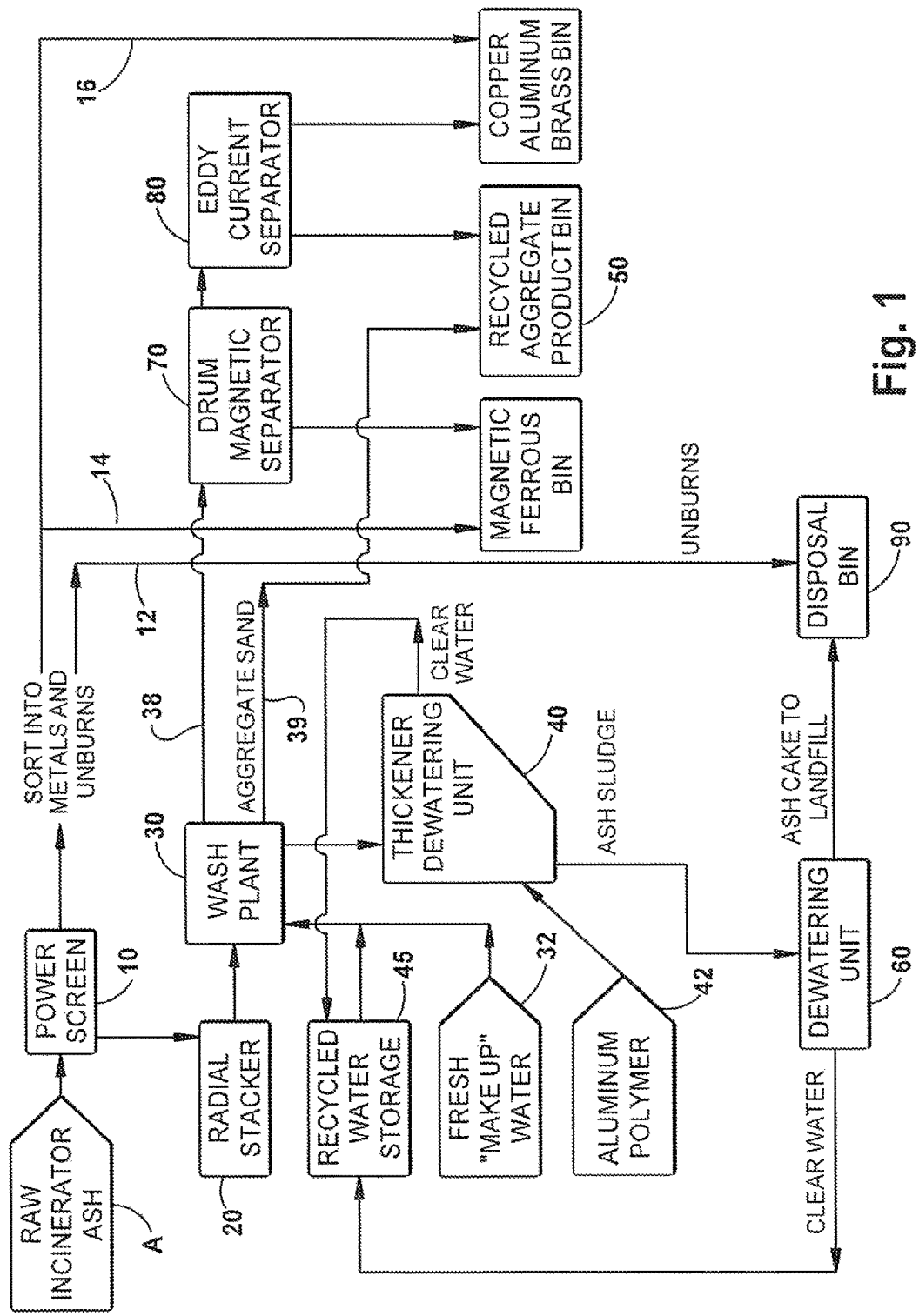
FIG. 1 is a schematic diagram of a first embodiment of an incineration byproduct processing and treatment system of the present disclosure, and FIGS. 2A-2C together form a schematic diagram of an alternate embodiment of an incineration byproduct processing and treatment system of the present disclosure.

The ash processing systems and methods of the present disclosure, and related inventions, utilize separation and washing processes which capture a greater percentage of metals, produces higher quality metals with higher value, and also produces at least two recycled aggregate products not produced by any prior system or method. In a first representative embodiment of a system and related methods of the disclosure, as illustrated and described with reference to FIG. 1, an incineration byproduct processing system and method processes raw incineration ash A, including by use of a power or shaker screen at 10 with a screen size of approximately 3 inches such that large items great than 3 inches are separated from the ash. This particle size fraction of the waste material is typically large metal pieces and concrete, unburns, etc. The material fraction larger an approximate 3 inch dimension is then separated, manually or automated, at line 12, and any metals are removed for recycling at lines 14, 16. The material fraction less than 3 inch dimension is discharged from the screen to a conveyor and drops onto a stacker at 20, such as a radial stacker that transfers the material to a multiple screen wash plant at 30, such as a triple screen wash plant, that utilizes water from sources 32 and 45 to separate and wash the incineration byproducts. The ash drops onto the wash plant via a watering box, for example within the wash plant, that presoaks the material; and the material then travels over a 1" screen. The material then is separated from the ash by the first deck into greater-than 1" and less-than 1" fractions. The less-than 1" fraction falls onto the second lower screen with a screen size of ½", The greater-than ½" material is discharged from the wash plant and joins the greater-than 1" fraction of mixed metals and aggregate. The less-than ½" fraction falls onto the final screen, such as for example a No. 6 mesh. The greater-than 6 mesh material discharges from the wash plant. The less-than 6 mesh material drops into the bottom of the wash plant, for example and is pumped to a thickener 40 for ash separation from the wash water, as further described. A large basin with sand screws is incorporated into the bottom of the wash plant. The basin is filled with water and has adjustable weir plates to control particulate separation. The heavy fine fraction drops to the bottom of the basin and is collected by the sand screws and discharges the plant as recycled aggregate course sand, for example to bin 50. The very fine material passes over the weir plates and is discharged to the ash collection and dewatering system 60. The particle size passing the weirs can be controlled by a counter current underflow system. From the wash plant, two products are created as referenced above; aggregate sand at 39 and greater-than 6 mesh to less-than 3" mixed recycled aggregate and mixed metals.

The metals mixed with aggregate are clean and of higher quality and value than traditionally separated metals. Additionally, the removal of the fines greatly improves the capacity of separation equipment such as drum magnets and eddy current machines. From the discharge of the wash plant at 38, the mixed metals and aggregate are passed over a drum magnet separator 70 to separate ferrous material. From there, the remaining material passes through a high frequency eddy current separator 80 to separate out non-ferrous metals. Finally or optionally, the material can be passed through an air knife separation/elutriation system to remove remaining unburned material from the final recycled aggregate product. The final aggregate product, which passes toxicity chemical leaching procedure (TCLP) and synthetic particle leaching procedure (SPLP) testing requirements, is ideal for use as a recycled aggregate for asphalt production. The gradation of the material is weighted to the smaller fraction and contains stones, crushed glass, and ceramics.

The final process is to separate the fine ash material from the wash water such that the water can be cleaned and recycled to the head of the wash plant. The system is generally a closed loop that does not require large quantities of fresh water to operate. The ash is separated from the water via a clarifier/settler system at thickener 40. Ash laden water is treated to adjust pH and then with alum coagulant, followed by addition of a propriety anionic polymer flocculant which can be fed at 42 to the thickener 40. The mixture and quantity of each chemical added is controlled by injection systems and is dependent on particle size and solid concentrations. The treated water is then mixed in a flocculant tank to provide good contact of chemical and solids and encourages flocculent growth. The water is then passed through an inclined plate settler where solids settle to the bottom of the clarifier, and the cleaned water exits the top of the system where it's pumped to the clear water storage tanks 45 that are the source of water for the wash plant. Water is passed through the wash circuit via various high pressure high flow pumps. The flocin the clarifier is discharged from the settler to a sludge tank and then pumped into a dewatering system 60, which may include, for example, plate and frame press; belt filter press; centrifugal dryer; screw press or rotary kiln dryer. The ash floc is dewatered via a belt filter press or screw press to remove as much water as possible to reduce transportation costs of transporting the ash cake to final disposal 80 and to landfill. The ash cake, which also complies with TCLP and SPLP requirements, is greatly reduced in mass and volume as compared to prior systems and methods, and therefore greatly reduces disposal costs.

Figure 2A:
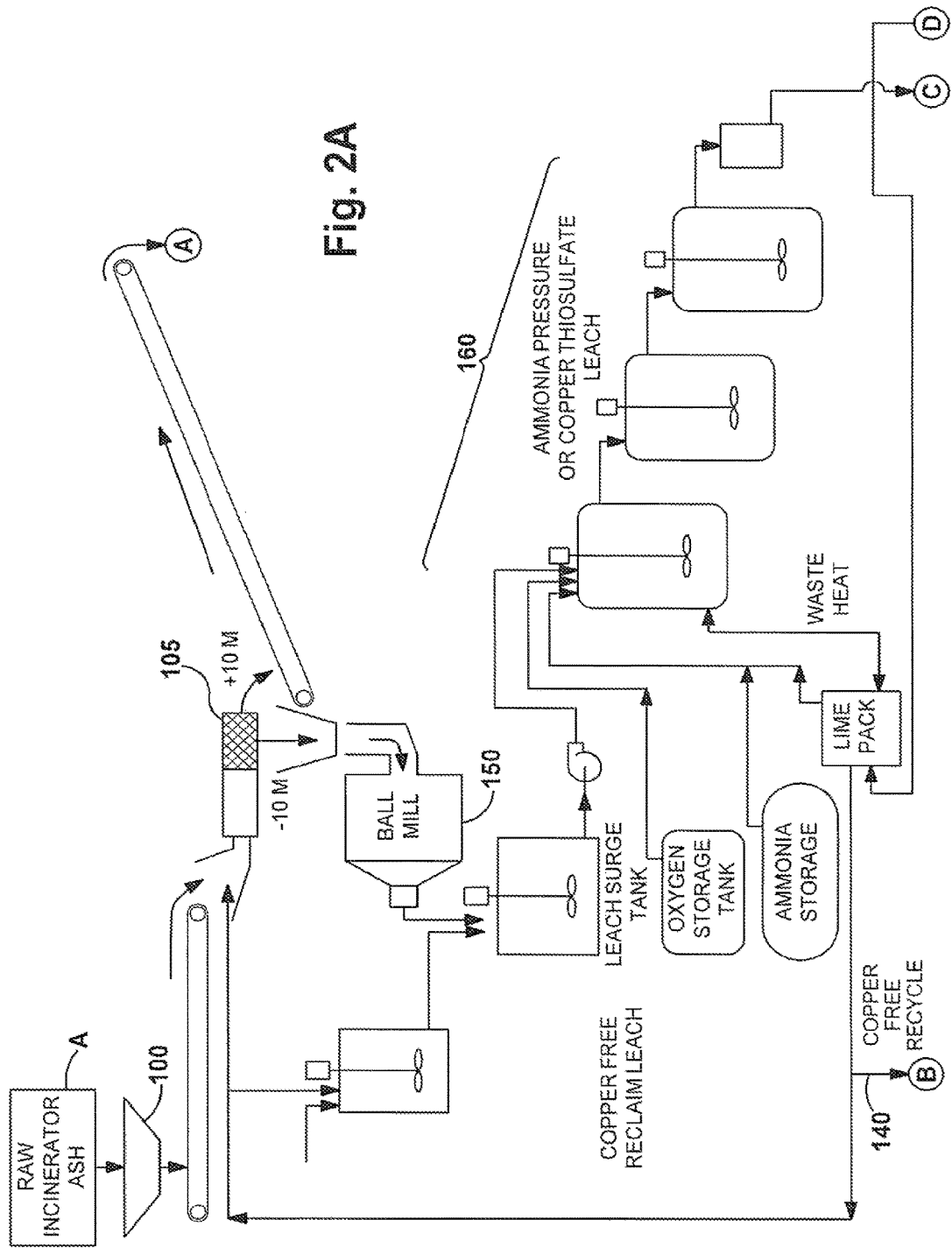
Figure 2B:
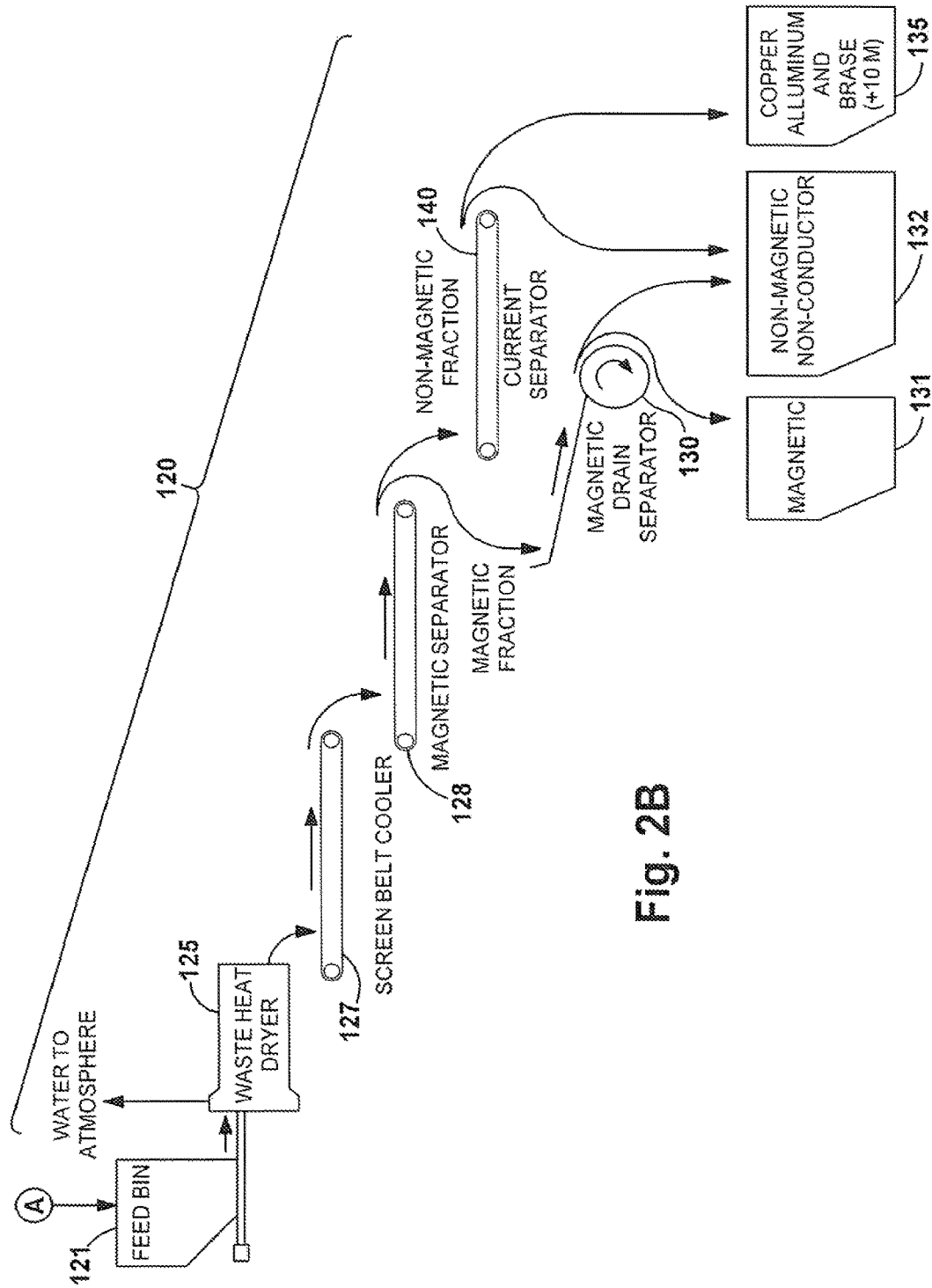
Figure 2C:
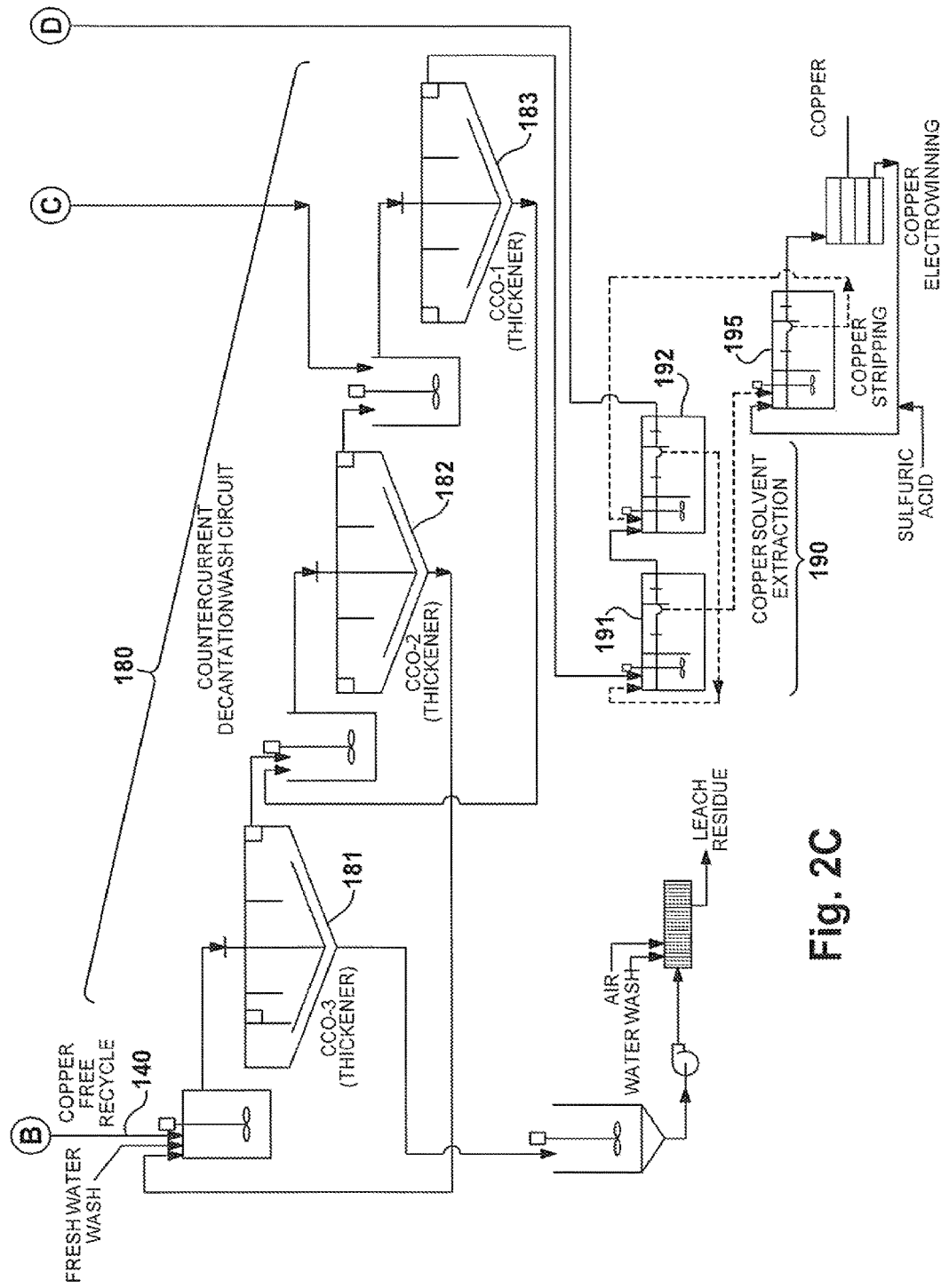

In an alternate embodiment of a system and related methods of the invention, as illustrated with reference to FIGS. 2A-2C, processed ash or incineration byproduct A, for example from a 1000 ton/day incineration facility is further treated for additional metal recovery and the generation of a benign residual material (tailings) that qualifies for open non-hazardous disposal. A combination of washing, screening and drying will prepare a plus 10 mesh (greater than or equal to 1.68 mm) fraction for metal recovery with magnetic and eddy current separators. The tails from this first process step will be mainly rocks, glass and ceramics that can be sold for cement aggregate. The minus 10 mesh (less than 1.68 mm) will be ground and chemically leached using ammonia or copper thiosulfate lixiviant for copper and silver recovery.

The objective of the process is to generate enhanced metals recovery from ash tailings processed at an incineration facility such as a refuse incineration facility, and to produce purified or cleansed ash for environmentally safe disposal. Metals of interest include copper, silver, aluminum, brass and iron. Equally important is to render the ash tailings from secondary treatment benign to allow open disposal of the final ash residue for example in a landfill or for use in new or recycled products such as building products or road construction, and in compliance with established environmental standards such as TCLP and SPLP.

Ash is removed from an incineration facility at the rate of, for example, 1,000 tons/day and transferred to a 200 tons capacity feed bin 100. A trommel screen 105 is used to mix recycled process water and ash to provide ash slurry for wet screening. Wet screening generates a dewatered plus 10 mesh oversize product for drying and processing in a separate circuit 120 for iron, copper, aluminum and brass recovery. Minus 10 mesh slurry is then ground and leached for copper and silver recovery.

The trommel plus 10 mesh material will be transferred to the feed bin 121 of a dryer. Testing has indicated that this stream will amount to 10-15 percent of the feed material.

Waste heat from the incinerator is used at 125 to dry the material and the dry product is cooled on a screened belt conveyor 127 to accommodate metal separation in conventional equipment. Magnetic ferrous material is first separated in a two stage separation and cleaning process. The first stage separation is with a belt magnetic separator 128. This machine is similar to a conveyor belt that uses a rare earth magnet for the head pulley. Magnetic material is retained on the head pulley and is discharged to a chute below and in back of the head pulley. Non-magnetic material falls straight off the end of the belt to a collection belt (not shown) under the machine. The magnetic portion falls onto a rare earth drum magnetic separator 130. The magnetics adhere to the drum and are discharged to a chute that reports to a cross belt that feeds a storage bin 131 for the magnetic product. Non-magnetics from the second stage of cleaning joins the non-magnetic fraction from the first stage at 132 and are advanced to the next stage of separation.

The non-magnetics are treated in a high frequency eddy current separator 140. This unit appears similar to a belt magnet however the head pulley contains an internal rare earth magnet rotating at 3,600 rpm. The high velocity magnetic field at the head pulley induces a current in any conductive metal above the belt. A resultant force generated in the piece of metal and the extra force and forward velocity of the belt "throws" the metal piece up and over a splitter at the end of the belt. Non-conductive pieces are not affected and fall straight down off the head pulley, for example to bin 132. The conductive metal is collected in a chute that reports to a storage bin 135. The non-conductive fraction of the waste will consist of clean rocks, glass and ceramics. From this point, this material can be used for example to fill below grade real estate or as an aggregate for cement manufacture, or other suitable applications and uses for recycled materials in infrastructure and buildings.

The trommel undersize will report by gravity to the feed chute of a conventional ball mill 150. Grinding will reduce the ash residue to 100% minus 35 mesh (less than 0.420 mm) for leaching. The water used for the milling process will be reclaimed water from the downstream leaching process. The ball mill discharge will be collected in a feed surge tank and pumped into subsequent chemical treatment tanks.

Chemical systems are used for copper and silver recovery, such as pressure ammonia leaching, which will recover only copper. In addition, a solution of copper sulfate and sodium thiosulfate, can be used for leaching both copper and silver, such as by the illustrated arrangement 160 for pressure ammonia leaching.

Feed from the leach surge tank is pumped into the first leach reactor. A pre-oxidation step may or may not be employed to enhance copper recovery. Ammonia gas from a storage tank and recovered ammonia gas from recycle leach solution is pumped into the first leach vessel. The pressure may be for example on the order of 100 psi and the leach vessels may be heated with waste heat from the incinerator. Feed cascades by gravity down a three vessel reactor for an overall retention time of approximately four hours. Leach slurry from the last reactor in the train is discharged through a blow-down reducer to atmospheric pressure. The leached slurry is treated for solids/solution separation either in a counter current decantation wash circuit (CCD) 180 or filtered directly to separate clean solution for copper recovery. The CCD circuit with three conventional thickeners 181-183 is depicted.

CCD uses successive stages of washing to generate a copper free residue for disposal and a clean copper bearing solution for subsequent processing. Wash solution for the CCD is provided using recycled copper-free (barren) solution 140 from the copper recovery stage. Excess ammonia is first removed from the recycle barren solution by raising the pH of the solution with lime or caustic and boiling the high pH solution in a closed vessel heated with waste heat from the incinerator. Low ammonia, copper-free barren solution is fed to the mix tank on the last stage of the CCD circuit and dilutes residue thickened in CCD-2. The thickened underflow of CCD-181 is filter feed where the residue is filtered, washed and air blown to make a benign tailing for open disposal. Wet magnetic separation may or may not be employed on the wet leach residue from the underflow of CCD-181. The overflows from each stage of the CCD circuit flow by gravity to eventually overflow the lip of CCD-183. This is the feed solution for copper recovery.

Copper recovery is by conventional solvent extraction at 190. This process contacts the copper bearing solution with an immiscible (non-soluble) organic that contains a liquid ion exchange reagent. Copper is absorbed by the organic phase and hydrogen ions are released from the organic to the aqueous phase. The unit employed is called a mixer settler. Typically, two extraction units 191, 192 are used to recover the copper into the organic stream. The organic stream is then contacted with strong acid solution at 195 and the copper is transferred to the strong acid. Hydrogen ions from the strong acid transfer into the organic phase to replace the copper ions transferred to the strong acid.

The strong acid stream is in closed circuit with a copper electrowinning tank house. This process uses direct electrical current in cells consisting of anodes and cathodes. Copper is "electro-won" onto the cathodes 198 in the cells and periodically harvested and bundled for shipping to copper end product manufactures; i.e. wire, tubing or brass.

Some of the features and advantages provided by the described systems, methods and processes include, without limitation: capture of approximately 4% or more of the in feed as non-ferrous metal (compared to prior art systems which capture on the order of 1%); capture of approximately 15% or more of the in feed as ferrous metal (compared to prior art systems which capture on the order of 12%); production of non-hazardous end products, including sand, recycled aggregate and final ash cake which passes TCLP testing; production of ash cake that is dewatered down to a moisture content of less than approximately 20%; production of sand and aggregate that is TCLP and SPLP test compliant for use in asphalt and other end use products; removal of unburns, batteries and other impurities from aggregate, and substantial chlorine content reduction such that total dissolved solids leaching from the recycled products are not an impediment to reuse.

Figure 3:
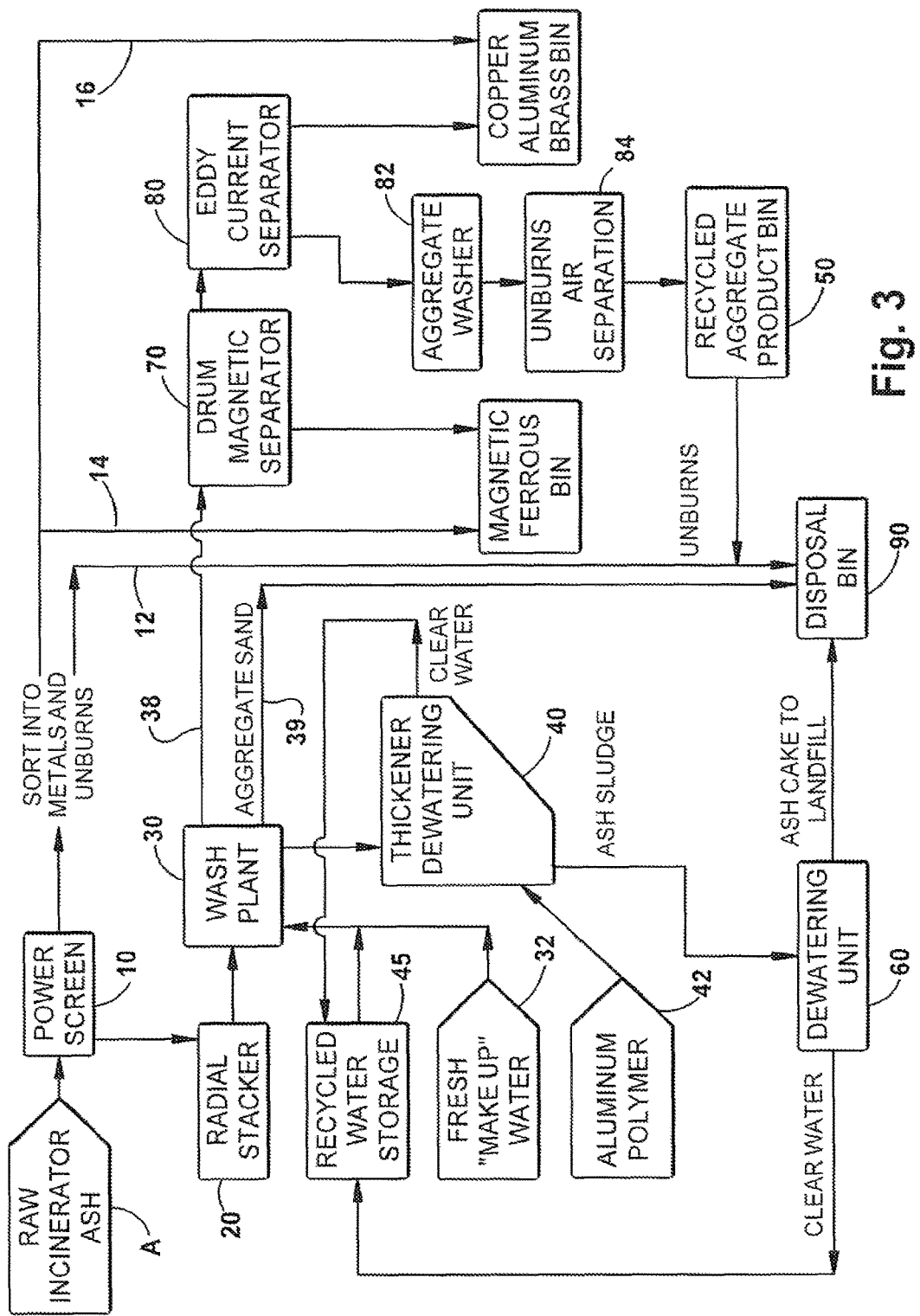
FIG. 3 is a schematic diagram of an additional alternate embodiment of an incineration byproduct processing and treatment system of the present disclosure.

FIG. 3 schematically illustrates an alternate embodiment of the system and method described with reference to FIG. 1, with certain differences in the material handling and treatment. In the system depicted in FIG. 3, the aggregate sand from the wash plant 30 is sent directly to the disposal bin 90. Remaining material from the wash plant 30 is sent to the drum magnetic separator 70 and eddy current separator 80, and then to additional aggregate washer 82 and to unburns separation 84, which may be an air knife separator or elutriation system. These additional steps and components provide further purification and mass reduction of waste ash by increased capture of metals and at greater purification of the recovered metals and aggregate materials. The increased amount of byproducts removed from the ash translates directly to reduced ash tonnage to be transported and disposed.

What is claimed is:

1. A method of processing incineration byproduct to obtain particles of unburned material, aggregate sand and ash, the process comprising the steps of:
    (a) receiving incineration byproduct and passing the incineration byproduct through a screen and separating particles having a dimension greater than approximately three inches from the incineration byproduct;
    (b) transferring the incineration byproduct to a wash plant equipped to hold water and the incineration byproduct;
    (c) mixing water with the incineration byproduct in the wash plant;
    (d) separating additional particles from the incineration byproduct in the wash plant, the additional particles having a dimension greater than approximately six mesh;
    (e) discharging the additional particles from the wash plant;
    (f) transferring incineration byproduct mixed with water from the wash plant to a thickener and separating ash from the water in the thickener as ash sludge discharged from the thickener and adjusting the pH of the water prior to discharge, and
    (g) dewatering the ash sludge discharged from the thickener to produce ash cake.

2. The method of claim 1 further comprising the step of sorting the particles having a dimension greater than approximately three inches between metals and unburns.

3. The method of claim 2 further comprising the step of sorting the metals between ferrous and non-ferrous.

4. The method of claim 1 further comprising the step of separating the additional particles from the incineration byproduct in the wash plant by use of two or more screens located in the wash plant, the two or more screens having openings greater in size than approximately six mesh.

5. The method of claim 1 further comprising the step of discharging aggregate sand from the wash plant.

6. The method of claim 5 further comprising the step of discharging aggregate sand from the wash plant by use of sand screws.

7. The method of claim 1 further comprising the step of separating ash from the water in the thickener by passing ash laden water in the wash plant over one or more weir plates.

8. The method of claim 1 further comprising the step of recycling water from the dewatering step to the wash plant.

9. The method of claim 1 further comprising the step of supplying water to the wash plant.

10. The method of claim 1 further comprising the step of using a power screen for separating particles having a dimension greater than approximately three inches from the incineration byproduct.

11. The method of claim 3 further comprising the step of using a drum magnetic separator for sorting the ferrous materials.

12. The method of claim 3 further comprising the step of using an eddy current separator for separating the non-ferrous materials.

13. The method of claim 1 further comprising the step of producing ash cake by use of a belt filter press.

14. The method of claim 1 further comprising the step of producing ash cake by use of a screw press.

15. The method of claim 1 further comprising the step of passing the additional particles discharged from the wash plant through an air knife separation/elutriation system.

16. The method of claim 1 further comprising the step of separating the ash from the water in the thickener by treatment of ash laden water in the thickener with pH adjustment, coagulant and flocculant.

17. The method of claim 16 further comprising the step of injecting pH adjustment, coagulant and flocculant into the ash laden water in the thickener in amounts dependent upon particles sizes and solid concentrations in the ash laden water in the thickener.

18. The method of claim 1 further comprising the step of drawing water from the thickener and directing water drawn from the thickener to recycled water storage.

19. The method of claim 18 further comprising the step of supplying water from the recycled water storage to the wash plant.

20. The method of claim 1 further comprising the step of transferring incineration byproduct screened of particles having a dimension of greater than approximately three inches to a radial stacker, and transferring the incineration byproduct from the radial stacker to the wash plant.

* * * * *